(No Model.)

L. L. BURDON.
INGOT FOR PLATED WIRE.

No. 327,655. Patented Oct. 6, 1885.

WITNESSES:
Charles Hannigan
Fred A. Guy

INVENTOR:
Levi L. Burdon
by Geo. H. Remington
Atty.

UNITED STATES PATENT OFFICE.

LEVI L. BURDON, OF PROVIDENCE, RHODE ISLAND.

INGOT FOR PLATED WIRE.

SPECIFICATION forming part of Letters Patent No. 327,655, dated October 6, 1885.

Application filed September 24, 1884. Serial No. 143,853. (No model.)

*To all whom it may concern:*

Be it known that I, LEVI L. BURDON, a citizen of the United States, residing at Providence, in the county of Providence and State of Rhode Island, have invented certain new and useful Improvements in Compound Ingots; and I do hereby declare the following to be a full, clear, and exact description of the invention, such as will enable others skilled in the art to which it appertains to make and use the same, reference being had to the accompanying drawings, and to letters and figures of reference marked thereon, which form a part of this specification.

This invention relates to cylindrical compound ingots; and it consists, essentially, of the improved method or process herein described of preparing and afterward soldering together the base-metal core and metallic shell to form the ingot, the latter then being adapted to be rolled and drawn down into seamless plated wire, the invention being an improvement upon United States Letters Patent No. 294,722, granted to me March 4, 1884.

Figure 1:
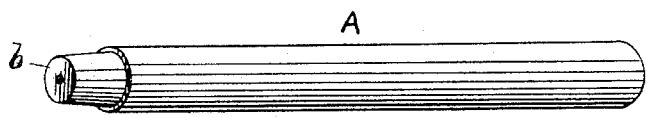
Figure 2:
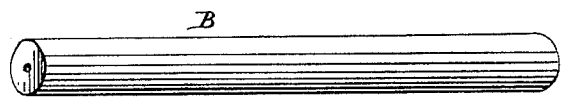
Figure 3:
Figure 4:
Figure 5:
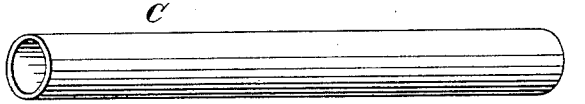
Figure 6:
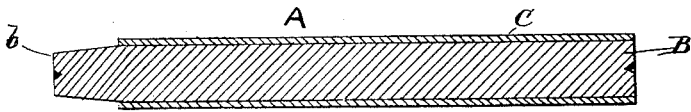
Figure 7:
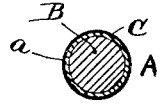

In the accompanying sheet of drawings, Figure 1 represents a perspective view of the compound ingot complete, soldered according to this invention, and having the core extending at one end beyond the shell or plate for the purpose of adapting the ingot to be readily grasped or clamped by the tools used in the drawing-down process. Fig. 2 is a view of the base-metal core. Fig. 3 is a view of the same showing its surface roughly coated with hard solder. Fig. 4 is the same after the solder has been fused and turned off true, thereby leaving a film of solder around the core. Fig. 5 is a view of the shell. Fig. 6 is a sectional view of the complete ingot, showing the core and shell soldered together and ready to be rolled and drawn into wire, and Fig. 7 represents a cross-sectional view of an ingot having the base-metal core and plated shell, such ingots being adapted to be made into wire having a very thin plate.

The object of this invention is to unite the cylindrical base-metal core and annular shell by means of hard solder in a practically more perfect manner than has been done heretofore. To this end I take the cylindrical base-metal core B, which is about eight inches in length by three-fourths of an inch in diameter, and turn it off true in a lathe, as in Fig. 2. Its surface is then covered with borax to serve as a flux, after which it is covered with silver or hard-solder filings $s$, as in Fig. 3, followed by fusing said solder in a furnace or by any other suitable means, the core, if necessary, being revolved slowly in the heated furnace meanwhile. After this the core is again placed in the lathe and the outer surface turned off, which then shows an unbroken surface of solder, $s'$, Fig. 4. The core may be coated by dipping it, suitably prepared, into molten solder, similar to the galvanizing process, the core subsequently being turned off, as before described.

C represents the shell or tube, which may be of gold or other precious metal, said tube being formed from a blank or in any other manner, a description of its manufacture not being deemed essential herewith. The tube, which practically is about an inch shorter than the core B, is reamed out to easily fit the core. The next step consists in inserting said core within the tube, the interior surface of the latter being perfectly clean and bright, and then placing the whole in a suitably-heated furnace or blast for the purpose of refusing the solder, which results in perfectly uniting the core and its shell and thus producing the ingot A, which is represented sectionally in Fig. 6, the tapering extension $b$ of the core adapting it to be clamped by the drawing tools.

I do not herewith restrict myself to any specific means for fusing the solder to unite the core and shell, as the ingot may be placed vertically in the furnace and heat applied at the lower end thereof, or it may be placed horizontally in the furnace and slowly revolved during the time of fusing; or, again, a series of flame-jets may be directed radially against it for that purpose. The ingot thus formed is now adapted to be rolled and drawn down into seamless plated wire, such wire having a higher commercial value than the old styles of plated wire, which have a soldered seam or joint throughout their length.

In certain lines of manufacture very thin-plate wire is required. This I am also enabled to produce by means of the ingot shown in cross-section in Fig. 7, wherein I use a plated shell, c, the gold or exterior metal thereof being represented by the heavy line a.

It is obvious that a hollow core may be employed in lieu of the solid one, B, without departing from the spirit of the invention.

Having thus described my invention, what I claim as new, and desire to secure by Letters Patent, is—

The method or process herein described of making compound ingots, which consists, first, in suitably preparing the surface of the cylindrical base-metal core; secondly, in covering said surface with solder, followed by fusing the solder and turning off or truing its surface; thirdly, in inserting the core within the metallic tube, the latter being suitably prepared and adapted for its reception; and, lastly, in introducing the shell with its inclosed core within a suitably-heated furnace or flame-jet, thereby re-fusing the solder, thus uniting or welding the core and tube, and completing the cylindrical compound ingot, after which it is adapted to be rolled and drawn down into seamless wire, substantially as described and set forth.

In testimony whereof I have affixed my signature in presence of two witnesses.

LEVI L. BURDON.

Witnesses:
CHAS. HANNIGAN,
GEO. H. REMINGTON.